May 28, 1940.  E. KAUFMANN  2,202,454

BRAKE MECHANISM

Filed Nov. 4, 1938

Inventor,
E. Kaufmann
By: Glascock Downing
& Seebold
Attorneys.

Patented May 28, 1940

2,202,454

UNITED STATES PATENT OFFICE 2,202,454

BRAKE MECHANISM

Egon Kaufmann, Mannheim, Germany

Application November 4, 1938, Serial No. 238,899
In Germany November 27, 1937

3 Claims. (Cl. 188—79)

My invention relates to a brake mechanism for the wheels of road vehicles, and particularly to a mechanism including duplicate pairs of brake shoes for a single drum, and a cam for operating the brake shoes in each pair. Such mechanism is provided for heavy motor and other vehicles in which powerful brakes with wide brake shoes and brake drums are required.

It has been found that such wide brake drums tend to expand irregularly under the heat produced by the friction of the brake shoes against the inner wall of the drum, and in the usual cup-shaped brake drums the heat tends to increase the inside diameter at the open end so that the drum becomes slightly tapered instead of presenting a true cylindrical face to the brake shoes. Such irregularities interfere with the grip of the brake shoes on the drum, and deteriorate the action of the brake.

It is an object of my invention to provide a mechanism of the kind described in which the action of the brake shoes is practically uniform notwithstanding any such irregularities.

To this end, in combination with the elements aforesaid, I provide shafts at least one of which is resilient to torsional forces and which are operatively connected to the individual cams, arrange a driving connection between the two shafts, and a brake lever for operating the two shafts in unison.

Under normal conditions, i. e., when the cup-shaped brake is of regular cylindrical configuration, the brake shoes bear upon the inner wall of the drum uniformly, but when the drum has become heated, and has assumed the slightly tapered configuration referred to, the grip of the brake shoes in the outer pair, that is, the pair which is near the open end of the drum, becomes less efficient. This is made up for, and practically uniform action of the shoes is produced, by the resilient connection described. The brake shoes in the inner pair, where the brake drum has not been deformed by heat expansion, or to a negligible extent only, obviously are the first to bear upon the inner wall of the brake drum, but since that portion of the drum where the brake shoes in the outer pair are arranged, has been deformed as described, the brake shoes in the outer pair would grip poorly, or not at all, if the cams for operating the shoes in the individual pairs were rigidly connected. Owing to the resilient connection according to the invention, however, the brake lever can be turned further after the brake shoes in the inner pair have engaged the brake drum, and their cam cannot be turned. By these means, the brake shoes in the outer pair are caused to bear upon the inner wall of the drum, notwithstanding its deformation by heat, and all four brake shoes are caused to bear upon the drum practically uniformly.

As stated, at least one of the cam shafts must be resilient, i. e., the other cam shaft may also be resilient, or it may be comparatively rigid.

In the embodiment of my invention which will be described by way of example, I make one of the cam shafts hollow, and consequently less resilient to torsional forces, while the other cam shaft, of high resiliency to such forces, is arranged co-axially within the hollow shaft.

In the accompanying drawing, the mechanism referred to and embodying my invention, is illustrated by way of example.

Figure 1:
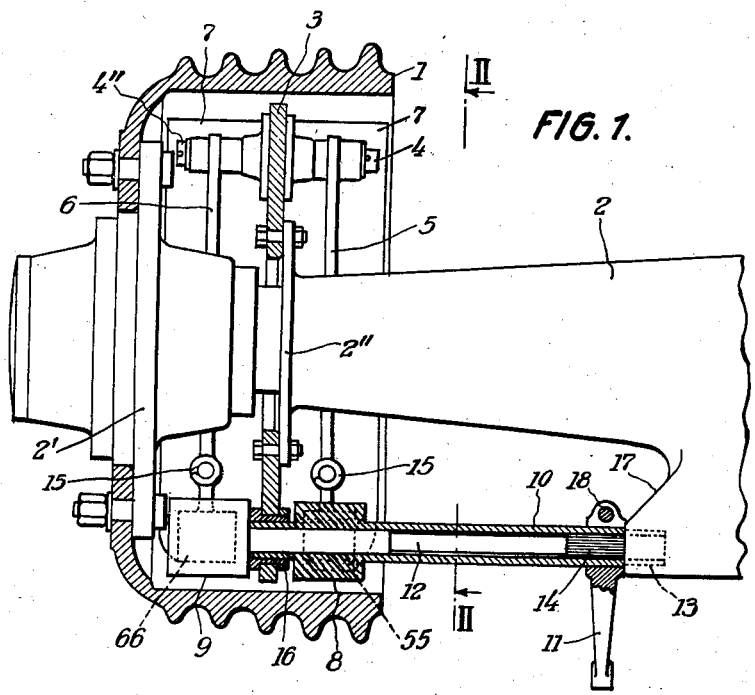
Fig. 1 is an axial section of the mechanism.

Referring now to the drawing, a cup-shaped brake drum 1, with radiating ribs on its perimeter, is secured on a journal 2 by means of a flange 2' near the outer end of the journal, and screws. A wheel, not shown, is seated on the brake drum in the usual way. An annular support 3 is arranged on another flange 2'' of the journal 2, and subdivides the interior of the brake drum 1 into two compartments, each for the reception of one pair of brake shoes. It is understood, of course, that I am not limited to two pairs of shoes, as illustrated.

Figure 2:
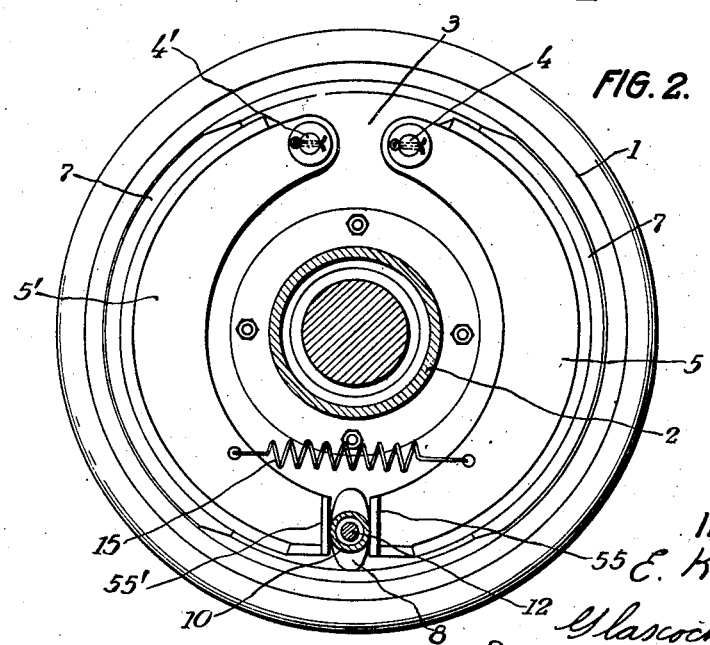
Fig. 2 is a section on the line II—II in Fig. 1.

In the outer compartment, i. e., the one which is at the open end of the brake drum 1, the outer pair of brake shoes 5 and 5' are arranged, as best seen in Fig. 2. At their upper ends, the shoes are fulcrumed about pins 4 and 4', respectively, projecting from the outer face of the support 3. The arrangement of the inner pair of shoes is quite similar. Only the shoe 6 of this pair is shown, and fulcrumed at its upper end about the pin 4'' which is axially aligned with the pin 4 of the shoe 5.

At its free lower end, each shoe is provided with an abutment plate, the abutment plates 55 and 66 of the shoes 5 and 6 being shown in dotted lines in Fig. 1, and the abutment plates 55 and 55' of the shoes 5 and 5' being shown in Fig. 2. A layer 7 of suitable material is placed on the outer side of each shoe, as best seen in Fig. 2. A cam 8 is provided for expanding the shoes 5 and 5' of the outer pair, and a cam 9 is provided for expanding the shoes of the inner pair, of which only the shoe 6 has been shown. Springs 15 are attached to the shoes in each pair and hold the abutment plates of the shoes against the corresponding cam.

The cam 8 for the outer pair of shoes is made integral with, or secured on, the inner end of a hollow shaft 10. Arranged coaxially within the hollow shaft 10 is a solid shaft 12 which projects beyond the boss of the cam 8 and is supported by a bearing 16 in the annular plate 3. The cam 9 for the inner pair of brake shoes is secured on, or made integral with, the inner end of the shaft 12. The outer end of the shaft 12 turns in a bearing 13 which is made in a lug 17 on the journal 2. The outer end of the hollow shaft 10 is serrated and its serrations engage in corresponding serrations 14 in the solid shaft 12 to effect the aforesaid driving connection between the two shafts. Obviously, other means might be provided for this purpose.

A brake lever 11 is seated on the outer end of the hollow shaft 10 with a divided boss, and the boss is seated firmly on the hollow shaft by means of a screw 18 extending through the two parts of the divided boss, so that the serrations on both shafts are held in firm engagement.

The outer shaft 10, being hollow or tubular, is obviously stronger against torsional forces than the inner, solid shaft 12.

In operation, when the brake lever 11 is operated, the shafts 10 and 12 are turned in unison through their serrations, and the cams 8 and 9 expand the brake shoes of the corresponding pairs and hold them against the inner wall of the brake drum 1 with their linings 7. Since the inner shaft 12 is resilient, the outer and more rigid shaft 10 can turn further after the cam 9 on the inner shaft has been locked by its brake shoes being at the end of their strokes, and impart extra movement to its brake shoes 5 and 5' so that any irregularity due to heat expansion of the brake drum is made up for.

As mentioned, it is not necessary that one of the cam shafts should be more resilient to torsional forces, and the other less. The important feature is the resilient connection between the brake lever and the cams, and this is also present if both cam shafts are equally resilient.

I claim:

1. A brake mechanism for the wheels of road vehicles, comprising a brake drum, duplicate pairs of brake shoes for the drum, shafts at least one of which is resilient to torsional forces, operatively connected to the individual pairs of brake shoes, means for holding the two shafts against relative rotation at one point, and a brake lever for operating the two shafts in unison.

2. A brake mechanism for the wheels of road vehicles, comprising a brake drum, duplicate pairs of brake shoes for the drum, a hollow shaft which is comparatively rigid to torsional forces, a cam on the shaft for operating one pair of brake shoes, another shaft which is more yielding to torsional forces than, and is arranged co-axially within, the hollow shaft, a cam on this other shaft for operating the other pair of brake shoes, means for holding the two shafts against relative rotation at one point, and a brake lever for operating the two shafts in unison.

3. A brake mechanism for the wheels of road vehicles, comprising a brake drum, duplicate pairs of brake shoes for the drum, a hollow shaft which is comparatively rigid to torsional forces, a cam on the shaft for operating one pair of brake shoes, another shaft which is more yielding to torsional forces than, and is arranged co-axially within, the hollow shaft, a cam on this other shaft for operating the other pair of brake shoes, serrated elements as a driving connection between the two shafts, and a brake lever for operating the two shafts in unison.

EGON KAUFMANN.